United States Patent
Sasaki

(10) Patent No.: US 11,251,993 B2
(45) Date of Patent: Feb. 15, 2022

(54) GATEWAY APPARATUS, MESSAGE TRANSMISSION METHOD, AND PROGRAM

(71) Applicant: NEC CORPORATION, Tokyo (JP)

(72) Inventor: Hirofumi Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 167 days.

(21) Appl. No.: 16/611,925

(22) PCT Filed: May 10, 2018

(86) PCT No.: PCT/JP2018/018170
§ 371 (c)(1),
(2) Date: Nov. 8, 2019

(87) PCT Pub. No.: WO2018/207884
PCT Pub. Date: Nov. 15, 2018

(65) Prior Publication Data
US 2021/0152395 A1 May 20, 2021

(30) Foreign Application Priority Data
May 11, 2017 (JP) .............................. JP2017-094496

(51) Int. Cl.
| H04L 12/66 | (2006.01) |
| H04L 29/08 | (2006.01) |
| H04L 29/06 | (2006.01) |

(52) U.S. Cl.
CPC .......... *H04L 12/66* (2013.01); *H04L 67/2823* (2013.01); *H04L 69/08* (2013.01)

(58) Field of Classification Search
CPC ...... H04L 12/66; H04L 67/2823; H04L 69/08
See application file for complete search history.

(56) References Cited

U.S. PATENT DOCUMENTS

| 7,697,951 B1 * | 4/2010 | Martin ................. H04W 88/16 455/519 |
| 8,943,195 B2 | 1/2015 | Demura et al. |

(Continued)

FOREIGN PATENT DOCUMENTS

| JP | 2006-014144 A | 1/2006 |
| JP | 2006-165723 A | 6/2006 |

(Continued)

OTHER PUBLICATIONS

"TTC JJ-90.30 Common interconnection interface between IMS operator's networks", The Telecommunication Technology Committee, [online], [searched on Apr. 25, 2017], Internet <URL:http://www.ttc.or.jp/jp/document_list/pdf/j/STD/JJ-90.30v3.pdf>, 87 pages.

(Continued)

*Primary Examiner* — Ricky Q Ngo
*Assistant Examiner* — Stephen N Steiner
(74) *Attorney, Agent, or Firm* — Sughrue Mion, PLLC

(57) ABSTRACT

A gateway apparatus includes: a gateway apparatus selection part configured to select a first gateway apparatus compliant with a first version of a communication protocol or a second gateway apparatus compliant with a second version of the communication protocol different from the first version of the communication protocol, the first and second gateway apparatuses being connected to a communication destination network, in such a manner that a selection rate of the first and second gateway apparatuses matches a predetermined rate; a message conversion part configured to convert a version of a message(s); and a transmission part configured to transmit a message(s) after matching the version of the communication protocol of the message(s) and the version of the communication protocol of the selected one of the first and second gateway apparatuses.

19 Claims, 12 Drawing Sheets

(56) References Cited

U.S. PATENT DOCUMENTS

| | | | | |
|---|---|---|---|---|
| 2010/0214979 A1* | 8/2010 | Kuehnel | ............... | H04W 48/16 |
| | | | | 370/328 |
| 2012/0082158 A1* | 4/2012 | Reddy | ............... | H04L 29/06068 |
| | | | | 370/389 |
| 2013/0031248 A1 | 1/2013 | Demura et al. | | |
| 2013/0142201 A1 | 6/2013 | Kim et al. | | |

FOREIGN PATENT DOCUMENTS

| | | | |
|---|---|---|---|
| JP | 2007-515823 | A | 6/2007 |
| JP | 2008-250976 | A | 10/2008 |
| JP | 2008-259099 | A | 10/2008 |
| JP | 2011-109317 | A | 6/2011 |
| JP | 2013-026993 | A | 2/2013 |
| JP | 2015-505431 | A | 2/2015 |

OTHER PUBLICATIONS

International Search Report for PCT/JP2018/018170, dated Jul. 31, 2018.

Communication dated Mar. 30, 2020, from the European Patent Office in application No. 18798158.4.

* cited by examiner

FIG. 5

| TRANSMITTING-SIDE IP VERSION | RECEIVING-SIDE IP VERSION | SELECTION RATE |
|---|---|---|
| IPv4 | IPv4 | SRa |
| IPv4 | IPv6 | SRb |
| IPv6 | IPv4 | SRc |
| IPv6 | IPv6 | SRd |

FIG. 9

CAPACITY OF TRANSMISSION LINE

| INTER-NETWORK IP | PATTERN 1 | 2 | 3 | 4 | 5 | 6 | 7 | 8 | 9 |
|---|---|---|---|---|---|---|---|---|---|
| IPv4 | 90 | 80 | 70 | 60 | 50 | 40 | 30 | 20 | 10 |
| IPv6 | 10 | 20 | 30 | 40 | 50 | 60 | 70 | 80 | 90 |

Sra=90%
Srb=10%

PROCESS 20 CALLS BY APPLYING RATES BASED ON TRANSMISSION CHANNEL CAPACITIES

NUMBER OF MESSAGES / CAPACITY OF TRANSMISSION LINE

| INTER-NETWORK IP | PATTERN 1 | 2 | 3 | 4 | 5 | 6 | 7 | 8 | 9 |
|---|---|---|---|---|---|---|---|---|---|
| IPv4 | 18/90 | 16/80 | 14/70 | 12/60 | 10/50 | 8/40 | 6/30 | 4/20 | 2/10 |
| IPv6 | 2/10 | 4/20 | 6/30 | 8/40 | 10/50 | 12/60 | 14/70 | 16/80 | 18/90 |

FIG. 10

| TRANS-MITTING-SIDE IP | RECEIV-ING-SIDE IP | NUMBER OF MESSAGES / CAPACITY OF TRANSMISSION LINE | | | | | | | | |
|---|---|---|---|---|---|---|---|---|---|---|
| | | PATTERN 1 | 2 | 3 | 4 | 5 | 6 | 7 | 8 | 9 |
| IPv4 | IPv4 | 9/90 | 8/80 | 7/70 | 6/60 | 5/50 | 4/40 | 3/30 | 2/20 | 1/10 |
| | IPv6 | 1/10 | 2/20 | 3/30 | 4/40 | 5/50 | 6/60 | 7/70 | 8/80 | 9/90 |
| IPv6 | IPv4 | 9/90 | 8/80 | 7/70 | 6/60 | 5/50 | 4/40 | 3/30 | 2/20 | 1/10 |
| | IPv6 | 1/10 | 2/20 | 3/30 | 4/40 | 5/50 | 6/60 | 7/70 | 8/80 | 9/90 |

Patterns 1–4: INCREASE IN CONVERSION OF IPv6=>IPv4

Patterns 6–9: INCREASE IN CONVERSION OF IPv4=>IPv6

FIG. 11

| TRANS-MITTING-SIDE IP | RECEIV-ING-SIDE IP | NUMBER OF MESSAGES / CAPACITY OF TRANSMISSION LINE | | | | | | | | |
|---|---|---|---|---|---|---|---|---|---|---|
| | | PATTERN 1 | 2 | 3 | 4 | 5 | 6 | 7 | 8 | 9 |
| IPv4 | IPv4 | 9/90 | 8/80 | 7/70 | 6/60 | 5/50 | 5/40 | 5/30 | 5/20 | 5/10 |
| | IPv6 | 1/10 | 2/20 | 3/30 | 4/40 | 5/50 | 5/60 | 5/70 | 5/80 | 5/90 |
| IPv6 | IPv4 | 5/90 | 5/80 | 5/70 | 5/60 | 5/50 | 4/40 | 3/30 | 2/20 | 1/10 |
| | IPv6 | 5/10 | 5/20 | 5/30 | 5/40 | 5/50 | 6/60 | 7/70 | 8/80 | 9/90 |

APPLY SELECTION RATE 50:50 WHEN TRANSMITTING-SIDE IP IS IPv6

APPLY SELECTION RATE 50:50 WHEN TRANSMITTING-SIDE IP IS IPv4

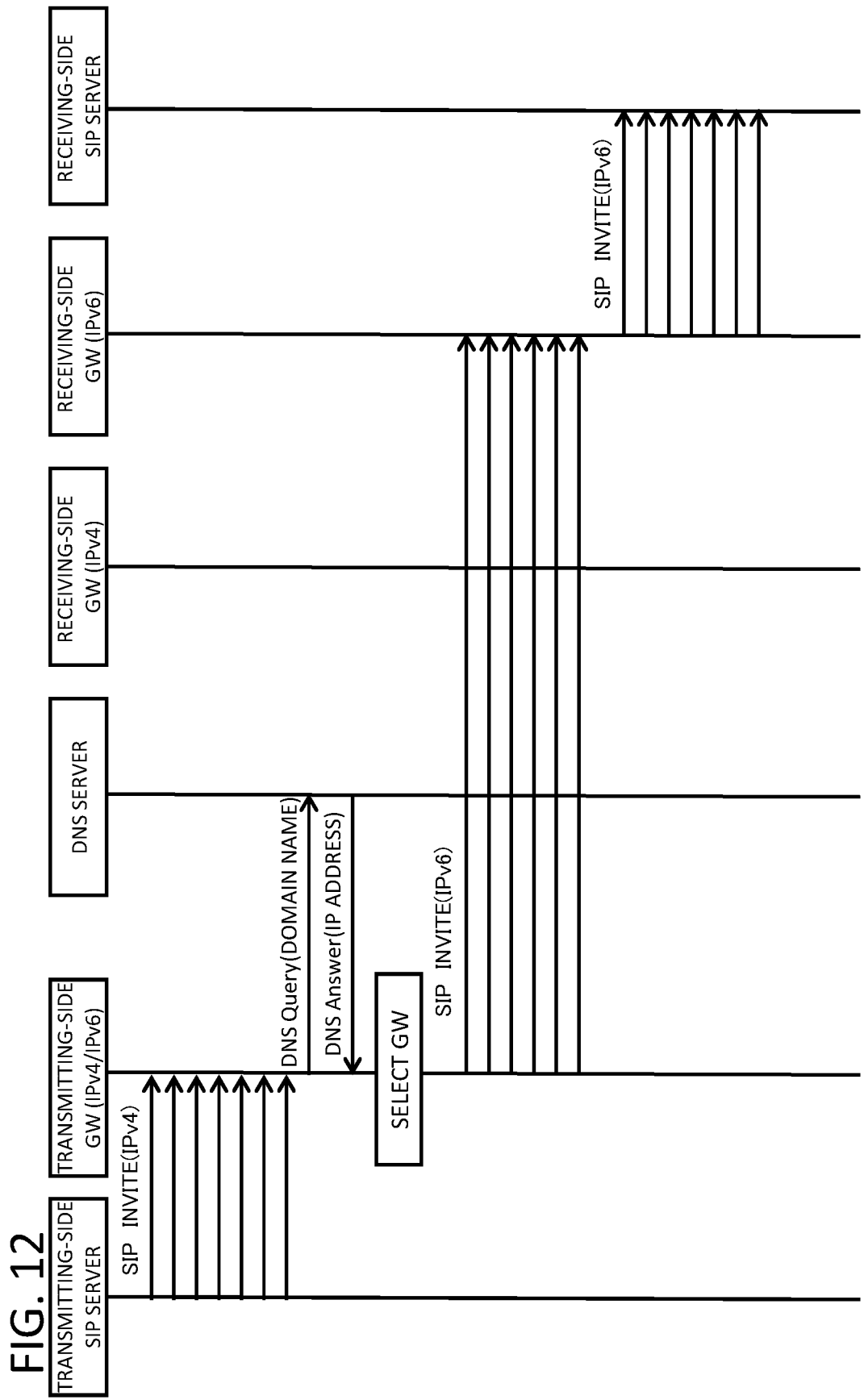

ative version of the communication protocol that it has been used only for the following IP versions: (1)
GATEWAY APPARATUS, MESSAGE TRANSMISSION METHOD, AND PROGRAM

REFERENCE TO RELATED APPLICATION

This application is a National Stage of International Application No. PCT/JP2018/018170 filed May 10, 2018, claiming priority based on Japanese patent application No. 2017-094496, filed on May 11, 2017, the disclosure of which is incorporated herein in its entirety by reference thereto.

FIELD

The present disclosure relates to a gateway apparatus, a message transmission method, and a program. In particular, it relates to a gateway apparatus, a message transmission method, and a program that converts a version of a communication protocol.

BACKGROUND

The 3rd Generation Partnership (3GPP) defines that a network may support any of the following IP versions: (1) IPv4 only, (2) IPv6 only, and (3) both IPv4 and IPv6. Thus, when IP Multimedia Subsystems (IMSs) are connected, there is a problem of these IMSs supporting different IP versions. The "IP" is the acronym for the Internet protocol, and "v4" and "v6" signify "version 4" and "version 6", respectively. Consequently, when networks of IMS operators are connected to each other, if the transmitting-side network and the receiving-side network support different IP (Internet protocol) versions (IPv4 and IPv6), communication connection could not be established.

Patent Literature (PTL) 1 discloses a protocol conversion server that can mediate a communication between information processing apparatuses without making the transmitting side aware of the kind of communication protocol on the receiving side. According to PTL 1, this protocol conversion server includes a subscriber management part 43 that holds information unique to an information processing apparatus 2, the information having been acquired from the information processing apparatus 2, and updates stored registration information when the protocol conversion server is requested to mediate a communication between the information processing apparatus 2 and an information processing apparatus 1. If the mediation of a requested communication is a communication from the information processing apparatus 1 to the information processing apparatus 2, this protocol conversion server determines whether the communication protocol of the information processing apparatus 2 matches the communication protocol of the information processing apparatus 1. As a result of the determination, if the communication protocols do not match, this protocol conversion server converts data received from the information processing apparatus 1 into data based on the communication protocol with which the information processing apparatus 2 is compliant and transmits the converted data to the information processing apparatus 2.

(4) Of 1.3.3 Reference Information in Non-Patent Literature (NPL) 1 describes that, if the receiving-side network detects a mismatched IP version, the receiving-side network requests the transmitting-side network to perform re-calling as a fallback connection performed when the IP versions do not match.

PTL 1: Japanese Patent Kokai Publication No. JP-2006-14144A

NPL 1: The Telecommunication Technology Committee, "TTC JJ-90.30 Common interconnection interface between IMS operator's networks," [online], [searched on Apr. 25, 2017], Internet <URL: http://www.ttc.or.jp/jp/document_list/pdf/j/STD/JJ-90.30v3.pdf>

SUMMARY

The following analysis has been given by the present inventor. The method in NPL 1 enables a communication even if different protocol versions are supported. However, each time the versions disagree, re-calling is needed. Therefore, NPL 1 has a problem in that a connection delay occurs.

Thus, as described in the Background section in PTL 1, a method in which the protocol is converted by a gateway (which will also be referred to as a "GW") is also used. In addition, there is a case in which the transmitting-side network is connected to a GW compliant with a dual stack of IPv4 and IPv6 and the receiving network is connected to two GWs, one being a GW compliant with a single stack of IPv4 and the other being a GW compliant with a single stack of IPv6 (see FIG. 12). While PTL 1 does not assume this case, a predetermined IP version (IPv4 or IPv6) is selected based on a policy of the operator, for example. No matter which one of IPv4 and IPv6 is selected, there is a problem of disproportionate transmission of messages to either one of the GW compliant with a single stack of IPv4 and the GW compliant with a single stack of IPv6. In addition, when the IP version of data transmitted from a SIP (Session Initiation Protocol) server on the transmitting side and the predetermined IP version (IPv4 or IPv6) are different from each other, the GW compliant with a dual stack of IPv4 and IPv6 on the transmitting side needs to perform IP version conversion processing, which is not essentially needed.

It is an object of the present disclosure to provide a gateway apparatus, a call processing message transmission method, and a program that can contribute to improving the utilization efficiency of resources in a configuration in which a transmitting-side GW can select one of two or more receiving-side GWs.

According to a first aspect, there is provided a gateway apparatus including a gateway apparatus selection part configured to select a first gateway apparatus compliant with a first version of a communication protocol or a second gateway apparatus compliant with a second version of the communication protocol different from the first version of the communication protocol, the first and second gateway apparatuses being connected to a communication destination network, in such a manner that a selection rate of the first and second gateway apparatuses matches a predetermined rate. This gateway apparatus further includes a message conversion part configured to convert, when the version of the communication protocol with which the selected one of the first and second gateway apparatuses is compliant is different from a version of a communication protocol of a message(s) received by the gateway apparatus, the version of the message(s). This gateway apparatus further includes a transmission part configured to transmit a message(s) after matching the version of the communication protocol of the message(s) and the version of the communication protocol of the selected one of the first and second gateway apparatuses.

According to a second aspect, there is provided a message transmission method, including: causing a gateway apparatus to select a first gateway apparatus compliant with a first version of a communication protocol or a second gateway apparatus compliant with a second version of the communication protocol different from the first version of the communication protocol, the first and second gateway apparatuses being connected to a communication destination network, in such a manner that a selection rate of the first and second gateway apparatuses matches a predetermined rate; causing the gateway apparatus to convert, when the version of the communication protocol with which the selected one of the first and second gateway apparatuses is compliant is different from a version of a communication protocol of a message(s) received by the gateway apparatus, the version of the message(s); and causing the gateway apparatus to transmit a message(s) after matching the version of the communication protocol of the message(s) and the version of the communication protocol of the selected one of the first and second gateway apparatuses. The present method is tied to a particular machine, which is a gateway apparatus that switches a message transmission destination.

According to a third aspect, there is provided a non-transitory computer-readable storage medium that records a program, causing a computer constituting a gateway apparatus to perform processing for: selecting a first gateway apparatus compliant with a first version of a communication protocol or a second gateway apparatus compliant with a second version of the communication protocol different from the first version of the communication protocol, the first and second gateway apparatuses being connected to a communication destination network, in such a manner that a selection rate of the first and second gateway apparatuses matches a predetermined rate; converting, when the version of the communication protocol with which the selected one of the first and second gateway apparatuses is compliant is different from a version of a communication protocol of a message(s) received by the gateway apparatus, the version of the message(s); and transmitting a message(s) after matching the version of the communication protocol of the message(s) and the version of the communication protocol of the selected one of the first and second gateway apparatuses. The program can be recorded in a computer-readable (non-transient) storage medium. Namely, the present disclosure can be embodied as a computer program product.

The meritorious effects of the present disclosure are summarized as follows.

The present disclosure can improve the utilization efficiency of resources in a configuration in which a transmitting-side GW can select a receiving-side GW. Namely, the present disclosure converts the gateway apparatuses described in Background into those having a function of improving the resource utilization efficiency.

BRIEF DESCRIPTION OF DRAWINGS

FIG. 5 illustrates an example of a management table held by the transmitting-side inter-network gateway apparatus according to the first exemplary embodiment of the present disclosure.

FIG. 9 illustrates values that are set in a management table of a transmitting-side inter-network gateway apparatus according to a second exemplary embodiment of the present disclosure.

FIG. 10 illustrates another example in which selection rates are inappropriate.

FIG. 11 illustrates values that are set in a management table held by a transmitting-side inter-network gateway apparatus according to a third exemplary embodiment of the present disclosure.

FIG. 12 illustrates a background technique.

MODES

Figure 1:
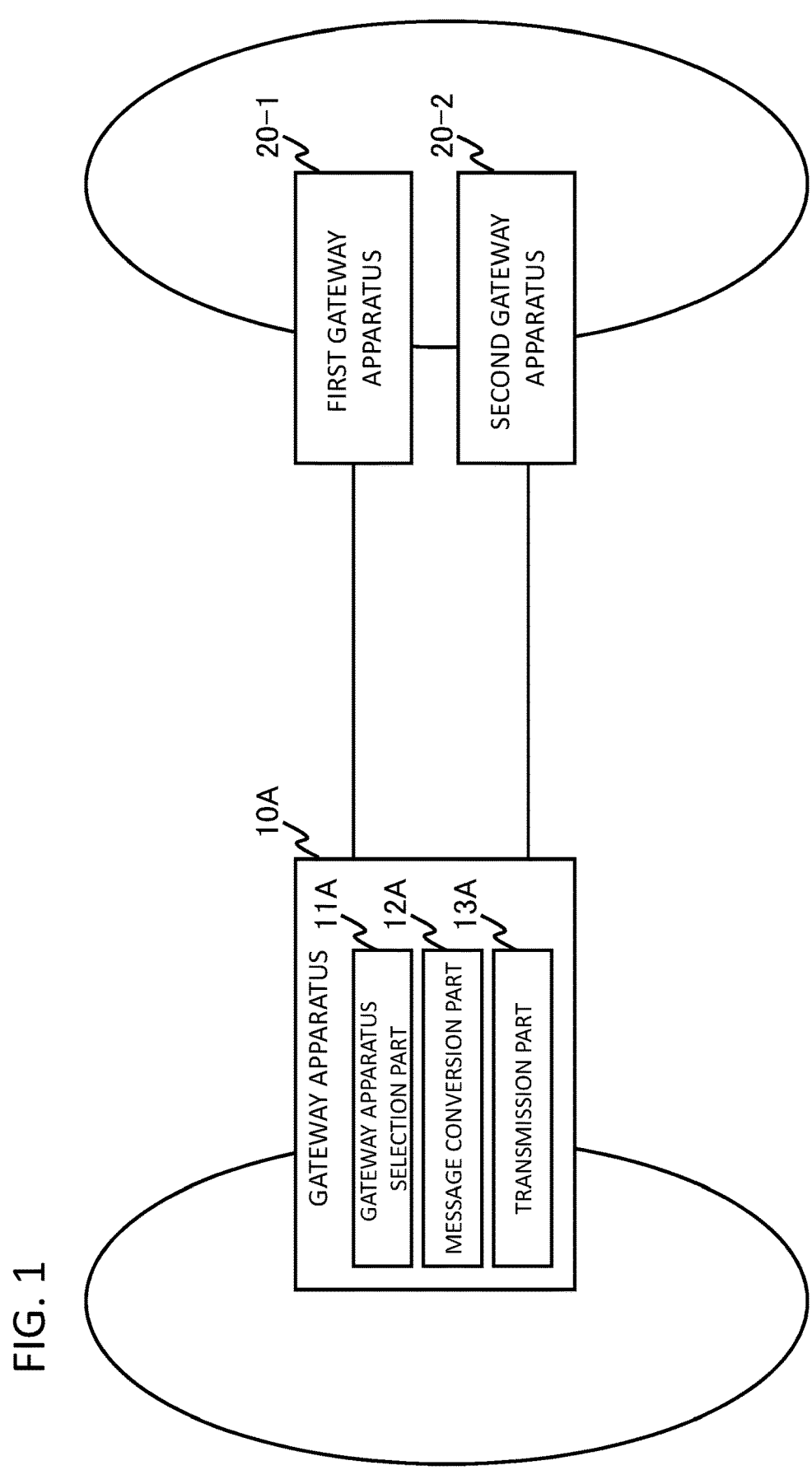
FIG. 1 illustrates a configuration according to an exemplary embodiment of the present disclosure.

First, an outline of an exemplary embodiment of the present disclosure will be described with reference to drawings. The reference characters that denote various elements in the following outline are merely used as examples for convenience to facilitate understanding of the present disclosure. Therefore, the reference characters are not intended to limit the present disclosure to the illustrated modes. An individual connection line between blocks in an individual drawing, etc., which the following description refers to, signifies both one-way and two-way directions. An individual arrow schematically illustrates the principal flow of a signal (data) and does not exclude bidirectionality. While not illustrated, a port or an interface exists at an input-output connection point in an individual block in an individual drawing.

As illustrated in FIG. 1, an exemplary embodiment of the present disclosure can be realized by a gateway apparatus 10A that includes a gateway apparatus selection part 11A, a message conversion part 12A, and a transmission part 13A.

More specifically, the gateway apparatus selection part 11A is connected to a communication destination network and selects a first gateway apparatus 20-1 or a second gateway apparatus 20-2 in such a manner that a selection rate of the first gateway apparatus 20-1 and the second gateway apparatus 20-2 matches a predetermined rate. The first gateway apparatus 20-1 connected to the communication destination network is a gateway apparatus that is compliant with a first version of a communication protocol. The second gateway apparatus 20-2 is compliant with a second version of the communication protocol different from the first version of the communication protocol with which the first gateway apparatus 20-1 is compliant.

When the version of the communication protocol with which the first or second gateway apparatuses is compliant is different from a version of a communication protocol of a message(s) received by the gateway apparatus 10A, the message conversion part 12A converts the version of the message(s). The version of the communication protocol with which the first or second gateway apparatuses is compliant is the version of the communication protocol with which the gateway apparatus selected by the gateway apparatus selection part 11A is compliant.

The transmission part 13A transmits a message(s) after matching the version of the communication protocol of the message(s) and the version of the communication protocol of the selected one of the first and second gateway apparatuses.

Figure 2:
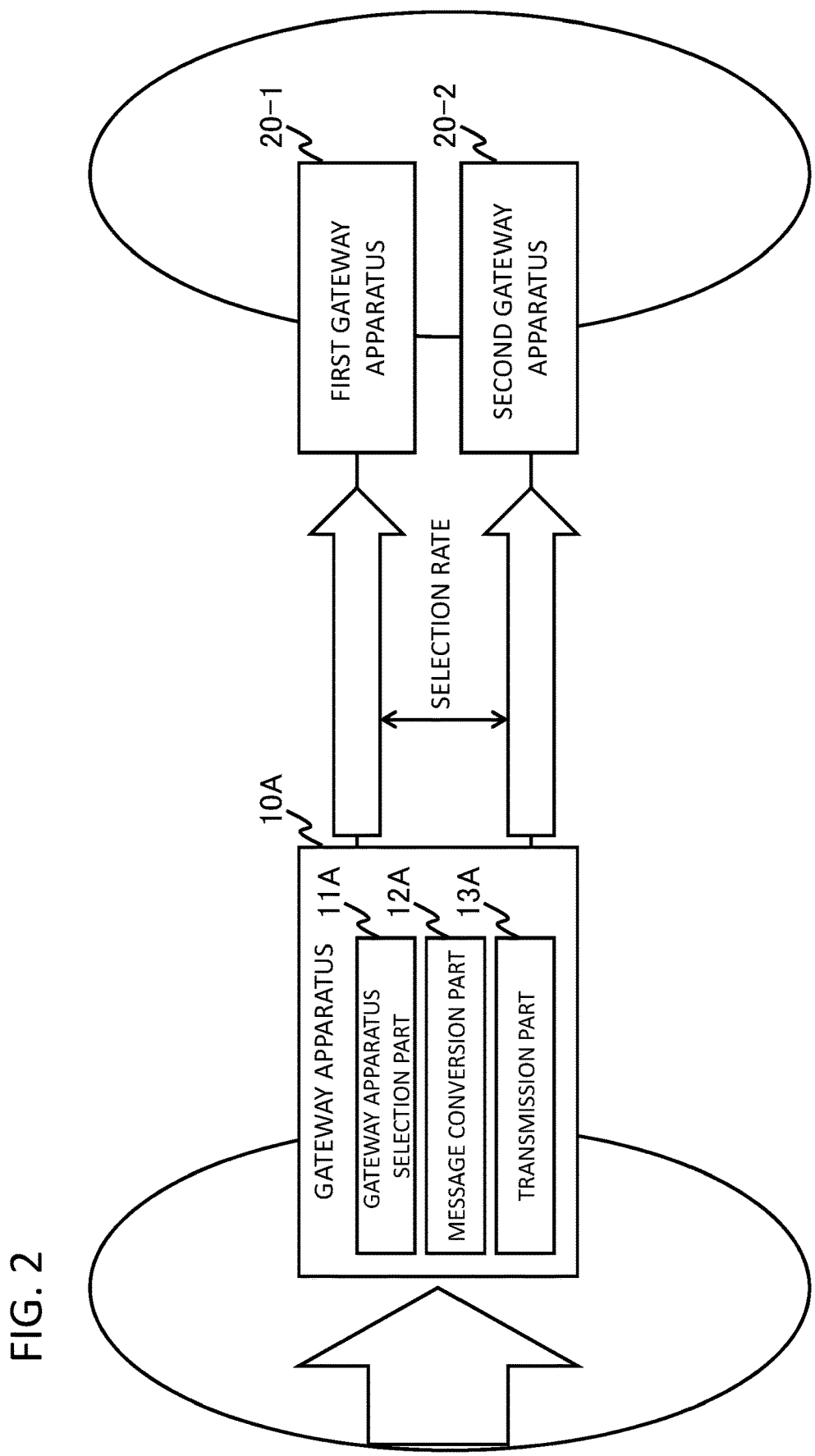
FIG. 2 illustrates an operation according to the exemplary embodiment of the present disclosure.

FIG. 2 illustrates an operation of the gateway apparatus 10A. When the gateway apparatus 10A receives a message to be transmitted to the first gateway apparatus 20-1 or the second gateway apparatus 20-2, the gateway apparatus 10A selects the first or second gateway apparatus. The gateway apparatus 10A selects a gateway apparatus in such a manner that the selection rate of the first gateway apparatus 20-1 and the second gateway apparatus 20-2 matches a predetermined rate. For example, when the selection rate of the first gateway apparatus 20-1 is 50%, the gateway apparatus 10A equally sorts messages to the first gateway apparatus 20-1 and the second gateway apparatus 20-2. When the selection rate of the first gateway apparatus 20-1 is 50%, the selection rate of the second gateway apparatus 20-2 is also 50%. Of course, the selection rate is not limited to 50%. An arbitrary value may be set as the selection rate in view of the difference between the processing capabilities of the first gateway apparatus 20-1 and the second gateway apparatus 20-2. Likewise, an arbitrary value may be set as the selection rate in view of, for example, the difference between the bandwidth (the transmission line capacity) of a line between the gateway apparatus 10A and the first gateway apparatus 20-1 and the bandwidth (the transmission line capacity) of a line between the gateway apparatus 10A and the second gateway apparatus 20-2.

When the gateway apparatus 10A performs the above sorting, if the version of the communication protocol of a message(s) differs from the version with which the transmission destination gateway apparatus is compliant, the gateway apparatus 10A converts the version of the message(s). In this way, the reachability of the message(s) is guaranteed.

By configuring the gateway apparatus 10A as described above, it is possible to effectively utilize two or more gateway apparatuses on the connection destination side while maintaining the advantage of protocol conversion using a gateway apparatus(es), which does not cause a connection delay. Of course, since the message conversion part 12A performs the conversion only when the versions are different, the resources of the gateway apparatus 10A are not used for any unnecessary conversions.

First Exemplary Embodiment

Figure 3:
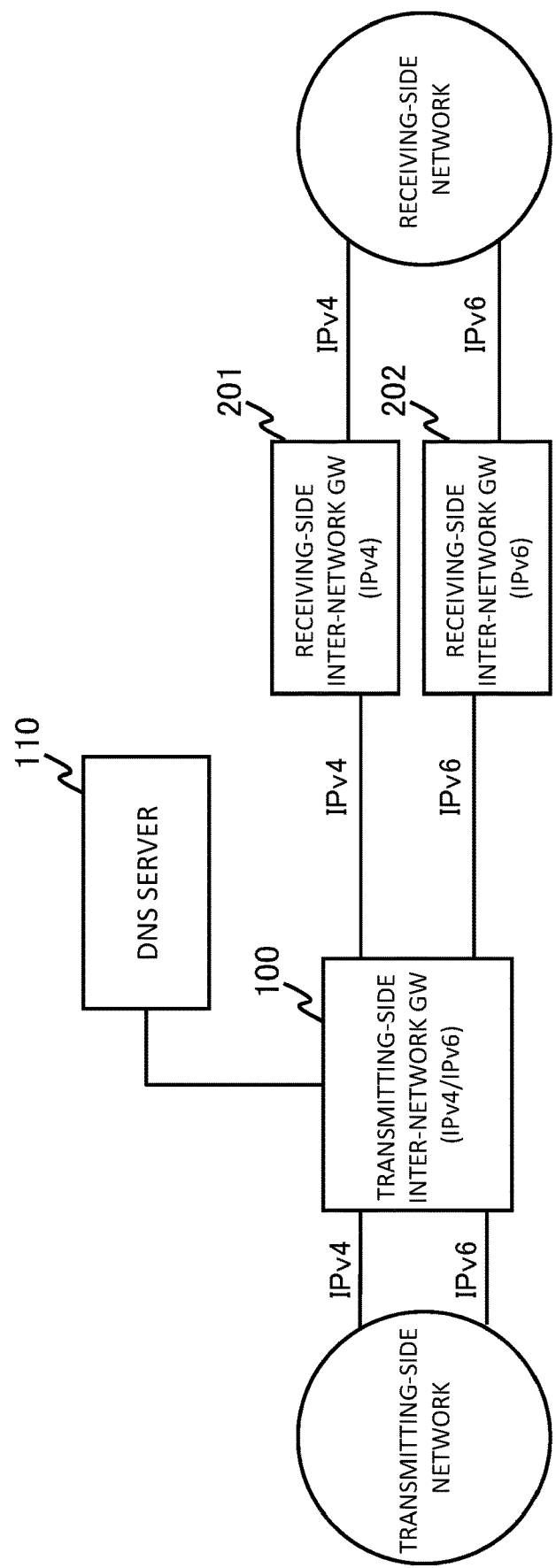
FIG. 3 illustrates a configuration according to a first exemplary embodiment of the present disclosure.

Next, a first exemplary embodiment of the present disclosure will be described in detail with reference to drawings. FIG. 3 illustrates a configuration according to the first exemplary embodiment of the present disclosure. As illustrated in FIG. 3, the configuration includes a transmitting-side inter-network GW 100 connected to a transmission-side network (a first network), receiving-side inter-network GWs 201 and 202 connected to a receiving-side network (a second network), and a DNS server 110. In the following description, an element on the signal transmitting side will be expressed as "a transmitting-side element", and an element on the signal receiving side will be expressed as "a receiving-side element". In addition, IPv4 and IPv6 are given to lines, each of which connects two elements in FIG. 3, and these IPv4 and IPv6 represent the IP versions of the corresponding transmission lines.

The transmitting-side inter-network GW 100 is an inter-network gateway apparatus compliant with a dual stack of IPv4 and IPv6 of the SIP. The transmitting-side inter-network GW 100 is connected to the transmission-side network that supports both IPv4 and IPv6. The transmitting-side inter-network GW 100 is connected to the receiving-side inter-network GWs 201 and 202.

The receiving-side inter-network GW 201 is an inter-network gateway apparatus compliant with a single stack of IPv4 of the SIP. The receiving-side inter-network GW 202 is an inter-network gateway apparatus compliant with a single stack of IPv6 of the SIP. The receiving-side inter-network GWs 201 and 202 are connected to the receiving-side network supporting both IPv4 and IPv6.

The DNS (Domain Name System) server 110 is a server that transmits, as a reply, an IP address corresponding to a domain included in a query from the transmitting-side inter-network GW 100. An A record (Address Record) and/or an AAAA record (Quad A Record) can be set in record information (DNS Answer) transmitted from the DNS server 110 to the transmitting-side inter-network GW 100. In the example in FIG. 3, since the two gateways 201 and 202 are arranged for the receiving-side network, both IPv4 and IPv6 are supported. Thus, the DNS server 110 transmits, as a reply, record information in which an A record and an AAAA record are set.

Figure 4:
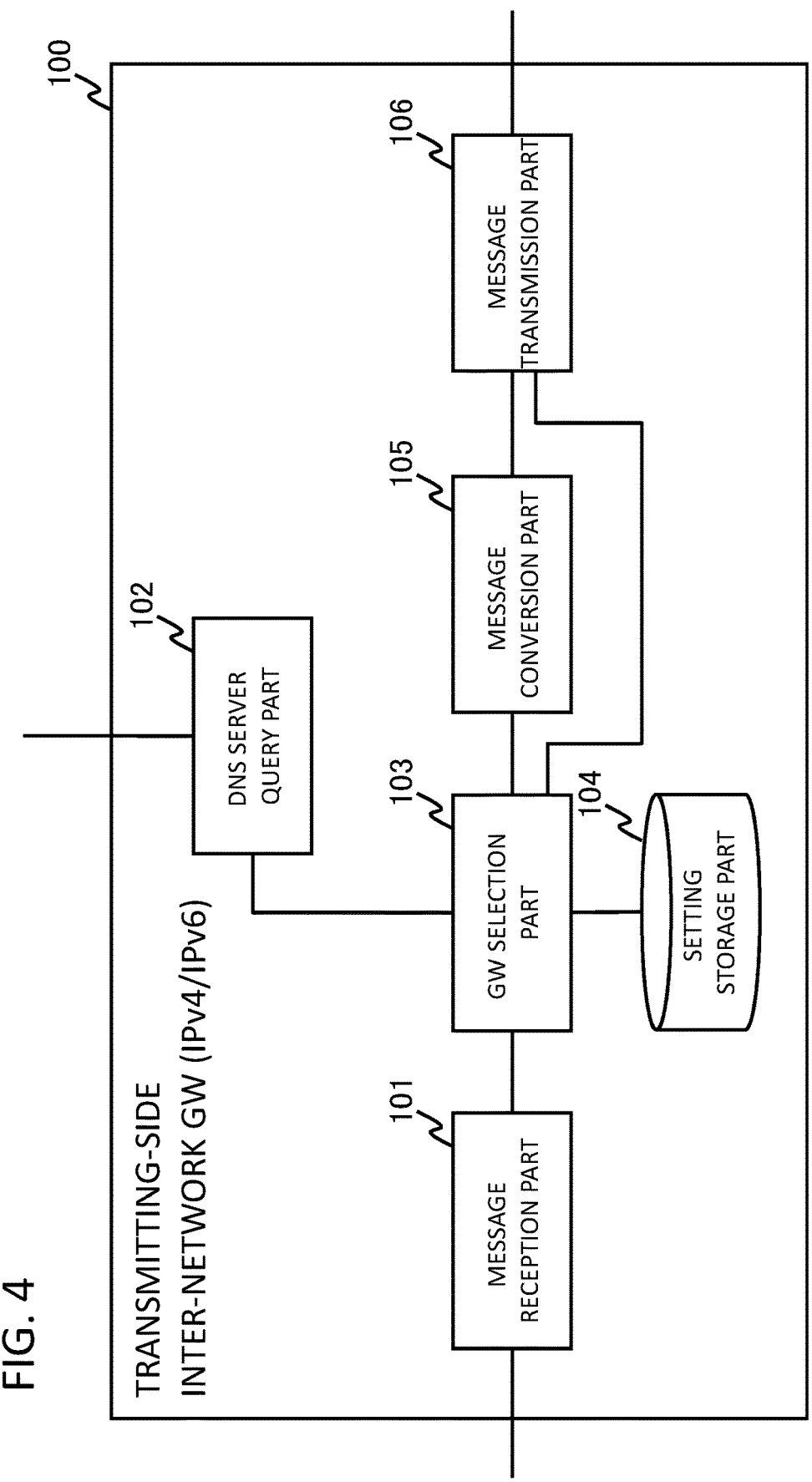
FIG. 4 is a functional block diagram illustrating a configuration of a transmitting-side inter-network gateway apparatus according to the first exemplary embodiment of the present disclosure.

FIG. 4 is a functional block diagram illustrating a configuration of the transmitting-side inter-network gateway apparatus according to the first exemplary embodiment of the present disclosure. As illustrated in FIG. 4, the configuration includes a message reception part 101, a DNS server query part 102, a GW selection part 103, a setting storage part 104, a message conversion part 105, and a message transmission part 106.

The message reception part 101 receives a message addressed to an apparatus connected to the receiving-side network from an apparatus connected to the transmission-side network. The present exemplary embodiment assumes that, for the sake of explanation, a SIP server of the transmission-side network transmits a SIP INVITE message (a session establishment request message).

The DNS server query part 102 queries the DNS server 110 about an IP address corresponding to the communication destination SIP URI (Uniform Resource Identifier) included in the INVITE message. Based on the record information received from the DNS server 110, the DNS server query part 102 notifies the GW selection part 103 that the (1) only IPv4 is supported, (2) only IPv6 is supported, or (3) both IPv4 and the IPv6 are supported. Thus, according to the present exemplary embodiment, the DNS server query part 102 serves as a determination part that determines whether the network connected to the communication peer is compliant with the first version of the communication protocol and the second version of the communication protocol different from the first version.

The GW selection part 103 selects the receiving-side inter-network GW 201 or 202 based on the IP version supplied from the DNS server query part 102 and supported by the receiving-side network. In the present exemplary embodiment, since the receiving-side network includes the two GWs 201 and 202 and supports both IPv4 and IPv6, the GW selection part 103 selects a gateway by using a selection rate(s) (transmission rate(s)) set in the setting storage part 104. In addition, when the IP version with which the selected GW is compliant does not match the IP version of a message(s) received by the message reception part 101, the GW selection part 103 transmits the message(s) to the message conversion part 105.

The setting storage part 104 is configured by an auxiliary storage apparatus or the like that stores setting information including the selection rate(s). FIG. 5 is an example of a management table in which an individual selection rate is defined based on a combination of a transmitting-side IP version and a receiving-side IP version. For example, when the IP version of a message received by the message reception part 101 is IPv4, the GW selection part 103 transmits the message to the receiving-side inter-network GW 201 with a selection rate SRa and to the receiving-side inter-network GW202 with a selection rate SRb. The selection rate SRb is calculated by 1-SRa. Likewise, when the IP version of a message received by the message reception part 101 is IPv6, the GW selection part 103 transmits the message to the receiving-side inter-network GW 201 with a selection rate SRc and to the receiving-side inter-network GW202 with a selection rate SRd.

Figure 6:
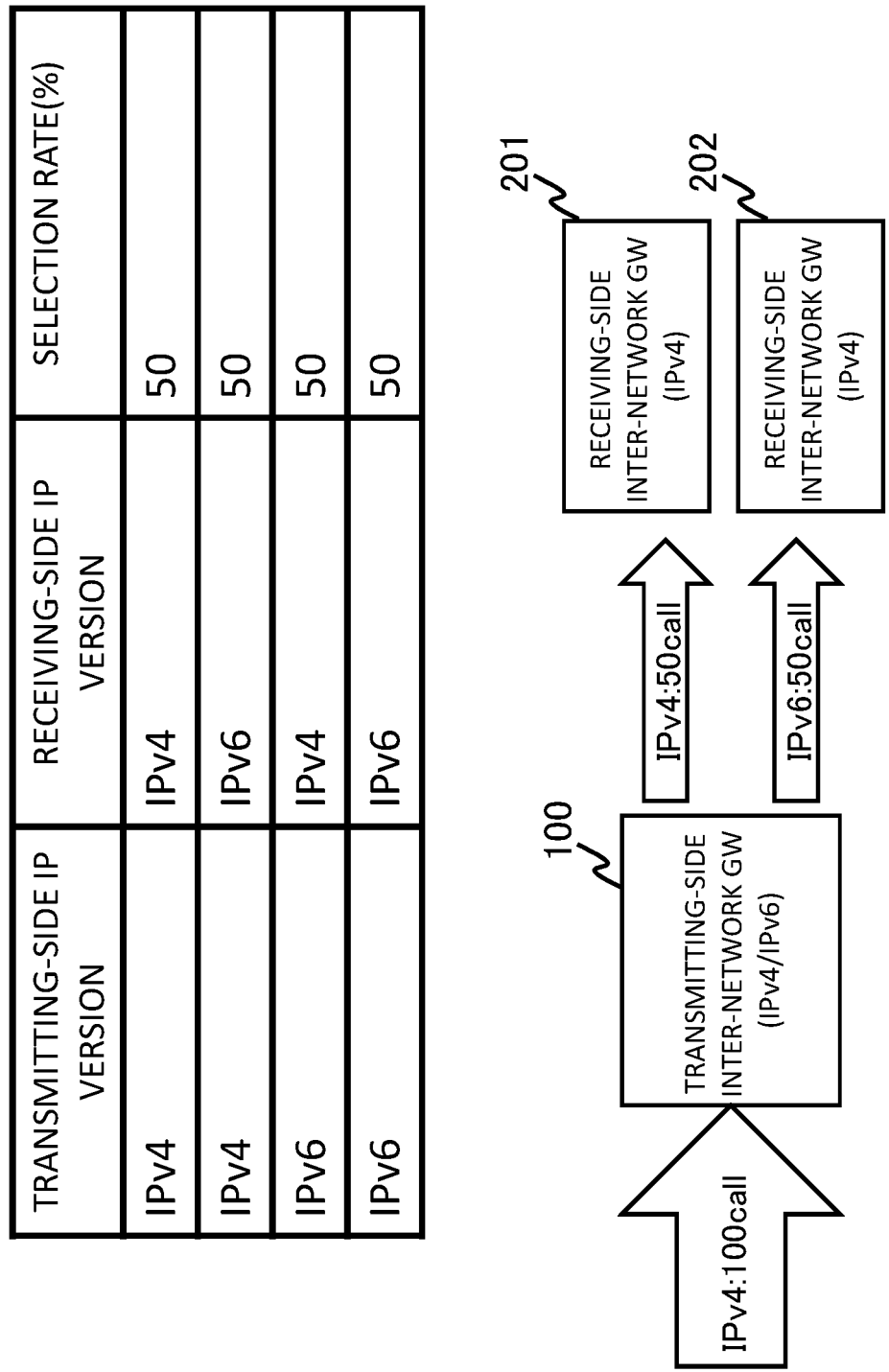
FIG. 6 illustrates a setting example of the management table held by the transmitting-side inter-network gateway apparatus according to the first exemplary embodiment of the present disclosure.

FIG. 6 illustrates a selection operation of the GW selection part 103 when all the selection rates SRa, SRb, SRc, and SRd are 50%. As illustrated in the lower part in FIG. 6, when the transmitting-side inter-network GW 100 receives 100 IPv4 messages, the GW selection part 103 selects the message transmission destinations in accordance with the selection rates corresponding to IPv4, which is the transmitting-side IP version, as illustrated in the upper part in FIG. 6. In the case of FIG. 6, since both the selection rates are 50%, 50 messages are sorted to each of the receiving-side inter-network GWs 201 and 202. As a result, messages are not disproportionately transmitted to either one of the receiving-side inter-network GWs 201 and 202. While an operation performed when the transmitting-side IP version is IPv6 is omitted in FIG. 6, since the selection rates are also 50% in this case, the same operation is performed. The user may manually set the above selection rates SRa, SRb, SRc, and SRd. Alternatively, as will be described in the following second and third exemplary embodiments, an individual one of the selection rates SRa, SRb, SRc, and SRd may be calculated automatically based on the volume of the capacity of a transmission line used for forwarding to the corresponding receiving-side inter-network GW.

The message conversion part 105 converts the IP version of a received message(s). Specifically, the message conversion part 105 converts IPv4 information in the IP header information and the SIP information in a received message into IPv6. The message conversion part 105 converts IPv6 information in the IP header information and the SIP information in a received message into IPv4.

The message transmission part 106 transmits a message received from the GW selection part 103 or a message converted by the message conversion part 105 to the receiving-side inter-network GW selected by the GW selection part 103.

An individual part (processing means) of the transmitting-side inter-network gateway apparatus 100 illustrated in FIG. 4 can also be realized by a computer program that causes a processor mounted on the inter-network gateway apparatus to perform the corresponding processing described above by using its hardware.

Figure 7:
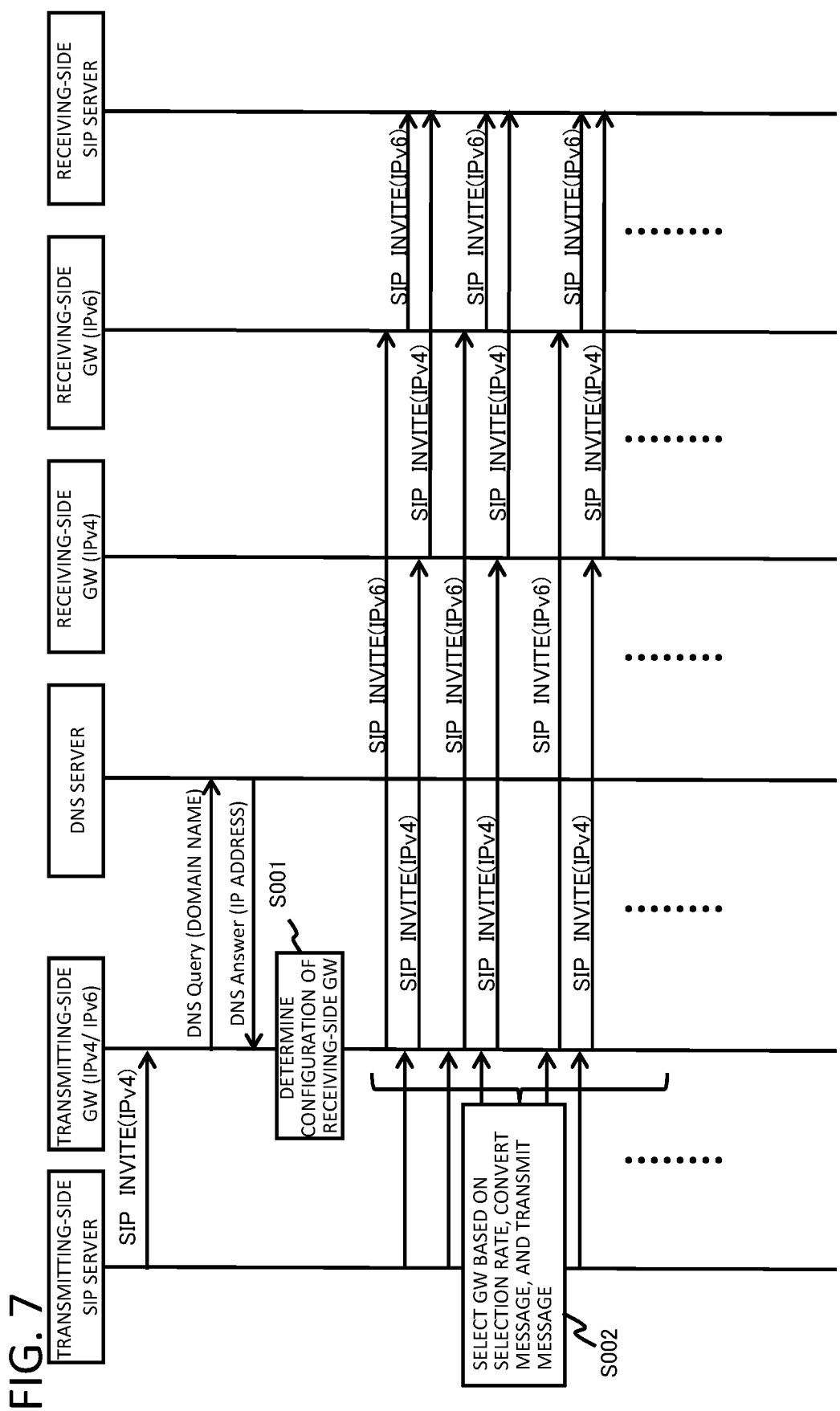
FIG. 7 is a sequence diagram illustrating an operation according to the first exemplary embodiment of the present disclosure.

Next, an operation according to the present exemplary embodiment will be described in detail with reference to drawings. FIG. 7 is a sequence diagram illustrating an operation according to the first exemplary embodiment of the present disclosure. FIG. 7 illustrates an example in which the transmission-side network transmits a SIP INVITE message (IPv4) to the receiving-side network compliant with a dual stack of IPv4 and IPv6.

When receiving a SIP INVITE message from the transmitting-side SIP server, the transmitting-side inter-network GW (the transmitting-side GW) 100 transmits a DNS Query to the DNS server 110 and queries about an IP address corresponding to the SIP URI.

The transmitting-side inter-network GW (the transmitting-side GW) 100 determines the configuration of the receiving-side gateway based on record information including the IP address supplied from the DNS server 110 (step S001). In this case, since the receiving-side network supports IPv4 and IPv6 and includes the receiving-side inter-network GWs 201 and 202, the transmitting-side inter-network GW (the transmitting-side GW) 100 receives record information in which an A record and an AAAA record are set. Thus, the transmitting-side inter-network GW (the transmitting-side GW) 100 determines that the receiving-side network supports both IPv4 and IPv6 and starts sorting the messages while referring to the management table held in the setting storage part 104.

For example, the transmitting-side inter-network GW (the transmitting-side GW) 100 converts a SIP INVITE message (IPv4) first received into an IPv6 SIP INVITE message (IPv6) and transmits the message to the receiving-side inter-network GW (the receiving-side GW) 202 (IPv6). Next, when receiving a SIP INVITE message (IPv4), the transmitting-side inter-network GW (the transmitting-side GW) 100 transmits the SIP INVITE message (IPv4) to the receiving-side inter-network GW (the receiving-side GW) 201 (IPv4) in accordance with a selection rate of 50%, for example. Thereafter, the transmitting-side inter-network GW (transmitting-side GW) 100 repeats the above operation.

Thus, according to the present exemplary embodiment, it is possible to sort the messages to the two inter-network GWs on the receiving side with a specified selection rate(s) while maintaining the advantage of a gateway-based conversion scheme, which does not cause re-routing resulting in a connection delay. As a result, it is possible to reduce the load of the version conversion processing of the transmitting-side inter-network GW (transmitting-side GW) 100, compared with cases in which conversion into an IP version specified by a predetermined policy.

While the above exemplary embodiment has been made based on an example in which the transmitting-side inter-network GW (the transmitting-side GW) 100 receives a SIP INVITE message, the transmitting-side inter-network GW (the transmitting-side GW) 100 can perform the same conversion and sorting on messages other than a SIP INVITE message.

Second Exemplary Embodiment

According to another exemplary embodiment different from the first exemplary embodiment, sorting is possible in view of the capacity (bandwidth) of a transmission line between the transmitting-side inter-network GW 100 and the receiving-side inter-network GWs 201 and 202. The following description will be made on a second exemplary embodiment in which the selection rate is adjusted in view of the capacity (the bandwidth) of a transmission line between the transmitting-side inter-network GW 100 and the receiving-side inter-network GWs 201 and 202. Since the second exemplary embodiment can be realized by almost the same configuration as that of the first exemplary embodiment, the second exemplary embodiment will be described with a focus on differences.

Figure 8:
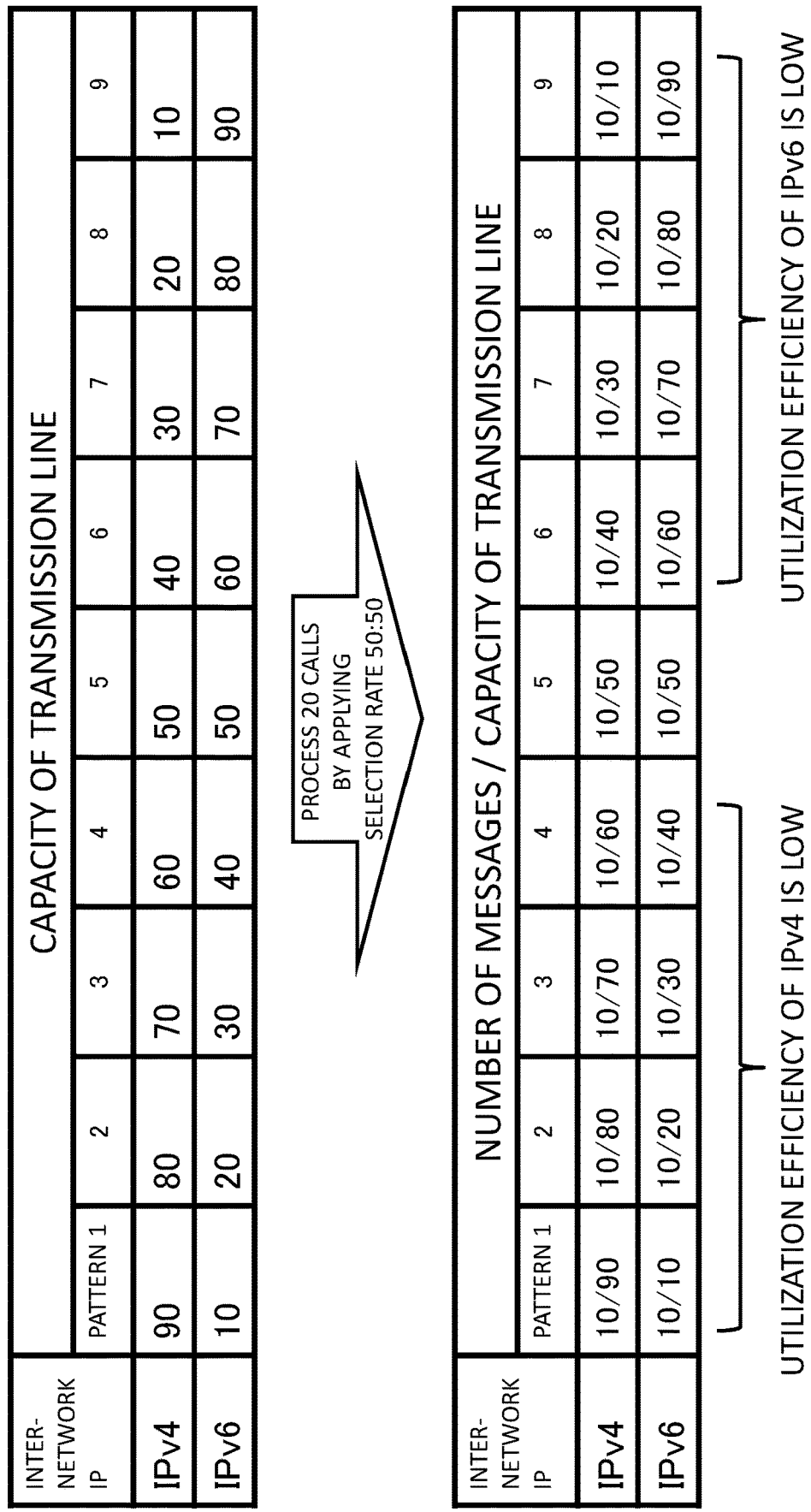
FIG. 8 illustrates an example in which a selection rate is inappropriate.

The upper part in FIG. 8 illustrates patterns when the transmission line capacity (the bandwidth; the unit is Gbps, for example) of IPv4 differs from that of IPv6 (the same value in pattern 5). The lower part in FIG. 8 illustrates the number of messages sorted to the receiving-side inter-network GW 201 and the number of messages sorted to the receiving-side inter-network GW 202 when the message are sorted by applying a selection rate of 50% under this configuration.

While the volume of the transmission line capacity (the bandwidth) of IPv6 is originally small in patterns 1 to 4 in the lower part in FIG. 8, 50% of the messages are sorted. In contrast, while the volume of the transmission line capacity (the bandwidth) of IPv4 is large in patterns 1 to 4, the number of messages is small. Namely, the utilization efficiency of the transmission line is low. Likewise, while the volume of the transmission line capacity (the bandwidth) of IPv4 is originally small in patterns 6 to 9 in the lower part in FIG. 8, 50% of the messages are sorted. In contrast, while the volume of the transmission line capacity (the bandwidth) of IPv6 is large in patterns 6 to 9, the number of messages is small. Namely, the utilization efficiency of the transmission line is low.

Thus, according to the present exemplary embodiment, as illustrated below, selection rates based on the rates between the transmission line capacities (the bandwidths) of IPv4 and IPv6 are set in the setting storage part 104 in the transmitting-side inter-network GW 100.

Selection rate SRa=transmission line capacity of IPv4/(transmission line capacity of IPv4+ transmission line capacity of IPv6)

Selection rate SRb=transmission line capacity of IPv6/(transmission line capacity of IPv4+ transmission line capacity of IPv6)

Selection rate SRc=transmission line capacity of IPv4/(transmission line capacity of IPv4+ transmission line capacity of IPv6)

Selection rate SRd=transmission line capacity of IPv6/(transmission line capacity of IPv4+ transmission line capacity of IPv6)

The lower part in FIG. 9 illustrates the number of messages sorted to the receiving-side inter-network GW 201 and the number of messages sorted to the receiving-side inter-network GW 202 when the messages are sorted by applying the selection rates calculated by the above expressions. For example, SRa and SRc in pattern 1 are calculated as 90/(90+10)=90% from the above expressions. Likewise, SRb and SRd in pattern 1 are calculated as 10/(90+10)=10% from the above expressions.

As illustrated by the number of messages in the individual pattern illustrated in the lower part in FIG. 9, according to the present exemplary embodiment, it is possible to set selection rates that realize sorting based on the volumes of the transmission line capacities (the bandwidths) of IPv4 and IPv6.

Third Exemplary Embodiment

According to the above second exemplary embodiment, the load of the IP version conversion processing of the transmitting-side inter-network GW 100 is not taken into consideration. However, sorting is also possible in view of the load of the IP version conversion processing of the transmitting-side inter-network GW 100. The following description will be made on a third exemplary embodiment in which the selection rate is adjusted in view of the load of the IP version conversion processing of the transmitting-side inter-network GW 100 in addition to the transmission line capacities between the inter-network GWs. Since the third exemplary embodiment can be realized by almost the same configuration as that of the first exemplary embodiment, the following description will be made with a focus on differences.

FIG. 10 illustrates a situation in which the version of the communication protocol is converted when the selection rates based on the rates between the transmission line capacities (the bandwidths) described in the second exemplary embodiment are used. For example, in pattern 1, since the selection rate SRa of IPv4 is 90%, nine of the 10 messages are transmitted to the IPv4 side. When the transmitting-side IP version is IPv4, since no conversion is performed, no problem occurs. However, when the transmitting-side IP version is IPv6, since the version of the communication protocol is converted for nine of the 10 messages, the load on the transmitting-side inter-network GW 100 is increased. Likewise, in pattern 9, since the selection rate SRb of IPv6 is 90%, nine of the 10 messages are transmitted to the IPv6 side. When the transmitting-side IP version is IPv6, since no conversion occurs, no problem occurs. However, when the transmitting-side IP version is IPv4, since the version of the communication protocol is converted for nine of the 10 messages, the load on the transmitting-side inter-network GW 100 is increased.

Thus, in the present exemplary embodiment, to reduce the occurrence of the conversion of the version of the communication protocol, upper limits are set for selection rates in patterns in which the version of the communication protocol is converted. Namely, (1) When transmission line capacity of IPv4>transmission line capacity of IPv6, SRa=transmission line capacity of IPv4/(transmission line capacity of IPv4+ transmission line capacity of IPv6)

SRb=transmission line capacity of IPv6/(transmission line capacity of IPv4+ transmission line capacity of IPv6)

SRc=predetermined upper limit (for example, 50%)

SRd=1−SRc (2) When transmission line capacity of IPv4<transmission line capacity of IPv6, SRa=predetermined upper limit (for example, 50%)

SRb=1−SRa

SRc=transmission line capacity of IPv4/(transmission line capacity of IPv4+ transmission line capacity of IPv6)

SRd=transmission line capacity of IPv6/(transmission line capacity of IPv4+ transmission line capacity of IPv6)

FIG. 11 illustrates the number of messages when sorting is performed with the selection rates set by the above (1) and (2). For example, since the transmission line capacity of IPv4 is larger than the transmission line capacity of IPv6 in pattern 1, the above (1) is applied, and the selection rates are set as SRa=90%, SRb=10%, SRc=50%, and SRd=50%. In addition, since the transmission line capacity of IPv4 is smaller than the transmission line capacity of IPv6 in pattern 9, the above (2) is applied, and the selection rates are set as SRa=50%, SRb=50%, SRc=10%, and SRd=90%. Thus, for example, the number of messages whose communication protocol version needs to be converted in pattern 1 is reduced to 6 in total, namely, one message corresponding to IPv4=>IPv6 and five messages corresponding to IPv6=>IPv4. Likewise, the number of messages whose communication protocol version needs to be converted in pattern 9 is reduced to 6 in total, namely, five messages corresponding to IPv4=>IPv6 and one message corresponding to IPv6=>IPv4.

As described above, according to the present exemplary embodiment, it is possible to perform sorting based on the volumes of the transmission line capacities (the bandwidths)

and set selection rates that reduce the occurrence of the conversion of the version of the communication protocol.

While exemplary embodiments of the present disclosure have thus been described, the present disclosure is not limited thereto. Further variations, substitutions, or adjustments can be made without departing from the basic technical concept of the present disclosure. For example, the configurations of the networks, the configurations of the elements, and the representation modes of the messages illustrated in the drawings have been used only as examples to facilitate understanding of the present disclosure. Namely, the present disclosure is not limited to the configurations illustrated in the drawings.

For example, in the above exemplary embodiments, the SIP has been used as an example of the communication protocol having different versions. However, the present disclosure is also applicable to a different communication protocol such as ITU-T H.323.

In addition, while not particularly limited in the above exemplary embodiments, the present disclosure is suitably applicable to interconnection of IMS operator networks whose IP versions are different as described above. Of course, the present disclosure is applicable to not only interconnection of IMS operator networks but also exchange of messages between networks whose IP versions are different from each other.

In addition, while the above exemplary embodiments have been described by using several examples of the selection rate calculation method, the selection rate(s) may be determined by using a different calculation method. For example, the selection rate(s) may be calculated in view of, for example, the performances of the receiving side inter-network GWs in addition to the transmission line capacities (bandwidths).

A selection rate(s) may be a static or dynamic value(s). For example, as a variation, the transmitting-side inter-network GW 100 may be provided with a function of acquiring the traffic density (load) per second and the number of error responses and may dynamically change a selection rate(s) based on these values.

In addition, while the above exemplary embodiments have been described assuming that the transmitting-side inter-network GW 100 determines the IP version with which the receiving-side network is compliant by transmitting a DNS Query to the DNS server 110, the transmitting-side inter-network GW 100 may use a different method to determine the IP version with which the receiving-side network is compliant. For example, the transmitting-side inter-network GW 100 may be provided with a subscriber management part as described in PTL 1 and determine whether the version needs to be converted from the subscriber information about the communication peer.

Finally, suitable modes of the present disclosure will be summarized.

Mode 1

(See the gateway apparatus according to the above first aspect)

Mode 2

It is preferable that the above gateway apparatus further include a determination part that determines whether a network connected to a communication peer is compliant with the first version of the communication protocol and the second version of the communication protocol different from the first version of the communication protocol and that, when the determination part has determined that the network is compliant with the first version of the communication protocol and the second version of the communication protocol, the gateway apparatus selection part perform selection of the first and second gateway apparatuses.

Mode 3

It is preferable that the above first and second gateway apparatuses be a gateway apparatus compliant with a call processing message(s) based on Internet protocol version 4 and a gateway apparatus compliant with a call processing message(s) based on Internet protocol version 6.

Mode 4

It is preferable that the above gateway apparatus include a setting holding part that receives and holds a selection rate of the first gateway apparatus and the second gateway apparatus.

Mode 5

In the above gateway apparatus, a rate between a capacity of a transmission line to the first gateway apparatus and a capacity of a transmission line to the second gateway apparatus can be used as the selection rate.

Mode 6

It is preferable that, in the above gateway apparatus, an upper limit be set for the selection rate so that the conversion of the version of the communication protocol is performed within a predetermined rate.

Mode 7

It is preferable that, in the above gateway apparatus, the message(s) be a call processing message(s) based on SIP (Session Initiation Protocol) or H.323.

Mode 8

In the above gateway apparatus, the determination part can determine the version of the communication protocol with which the network connected to the communication peer is compliant, based on record information included in a response from a DNS server.

Mode 9

It is also preferable that the above gateway apparatus further include a function of dynamically changing the selection rate based on load on the first and second gateway apparatuses or the number of error responses from the first and second gateway apparatuses.

Mode 10

The network handled by the above gateway apparatus may be a network of an operator that provides an IMS (IP Multimedia Subsystem).

Mode 11

(See the message transmission method according to the above second aspect)

Mode 12

(See the program according to the above third aspect)
Modes 11 and 12 can be expanded in the same way as mode 1 is expanded into modes 2 to 10.

The disclosure of each of the above PTL and NPL is incorporated herein by reference thereto. Variations and adjustments of the exemplary embodiments and examples are possible within the scope of the overall disclosure (including the claims) of the present disclosure and based on the basic technical concept of the present disclosure. Various combinations and selections (including partial eliminations) of various disclosed elements (including the elements in the claims, exemplary embodiments, examples, drawings, etc.) are possible within the scope of the disclosure of the present disclosure. Namely, the present disclosure of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed.

REFERENCE SIGNS LIST 10A gateway apparatus
11A gateway apparatus selection part
12A message conversion part
13A transmission part
20-1 first gateway apparatus
20-2 second gateway apparatus
100 transmitting-side inter-network GW
101 message reception part
102 DNS server query part
103 GW selection part
104 setting storage part
105 message conversion part
106 message transmission part
110 DNS server
201, 202 receiving-side inter-network GW

What is claimed is:

1. A gateway apparatus, comprising:
at least a processor; and
a memory in circuit communication with the processor,
wherein the processor is configured to execute program instructions stored in the memory to implement:
a gateway apparatus selection part configured to select a first gateway apparatus compliant with a first version of a communication protocol or a second gateway apparatus compliant with a second version of the communication protocol different from the first version of the communication protocol, the first and second gateway apparatuses being connected to a communication destination network, in such a manner that each of the first and second gateway apparatuses is selected at a selection rate which matches a predetermined rate;
a message conversion part configured to convert, when the version of the communication protocol with which the selected one of the first and second gateway apparatuses is compliant is different from a version of a communication protocol of a message(s) received by the gateway apparatus, the version of the message(s);
a transmission part configured to transmit a message(s) after matching the version of the communication protocol of the message(s) and the version of the communication protocol of the selected one of the first and second gateway apparatuses; and
a determination part configured to determine whether a network connected to a communication peer is compliant with the first version of the communication protocol and the second version of the communication protocol different from the first version of the communication protocol;
wherein, when the determination part has determined that the network is compliant with the first version of the communication protocol and the second version of the communication protocol, the gateway apparatus selection part performs selection of the first gateway apparatus or the second gateway apparatus.

2. The gateway apparatus according to claim 1; wherein the first and second gateway apparatuses are a gateway apparatus compliant with a call processing message(s) based on Internet protocol version 4 and a gateway apparatus compliant with a call processing message(s) based on Internet protocol version 6.

3. The gateway apparatus according to claim 1; wherein a rate between a capacity of a transmission line to the first gateway apparatus and a capacity of a transmission line to the second gateway apparatus is used as the selection rate.

4. The gateway apparatus according to claim 3; wherein an upper limit is set for the selection rate so that the conversion of the version of the communication protocol is performed within a predetermined rate.

5. The gateway apparatus according to claim 1; wherein the message(s) is a call processing message(s) based on SIP (Session Initiation Protocol) or H.323.

6. The gateway apparatus according to claim 1; wherein the determination part determines the version of the communication protocol with which the network connected to the communication peer is compliant, based on record information included in a response from a DNS server.

7. The gateway apparatus according to claim 1, further comprising a function of dynamically changing the selection rate based on load on the first and second gateway apparatuses or the number of error responses from the first and second gateway apparatuses.

8. A message transmission method, comprising:
causing a gateway apparatus to select a first gateway apparatus compliant with a first version of a communication protocol or a second gateway apparatus compliant with a second version of the communication protocol different from the first version of the communication protocol, the first and second gateway apparatuses being connected to a communication destination network, in such a manner that a selection rate of the first and second gateway apparatuses matches a predetermined rate;
causing the gateway apparatus to convert, when the version of the communication protocol with which the selected one of the first and second gateway apparatuses is compliant is different from a version of a communication protocol of a message(s) received by the gateway apparatus, the version of the message(s);
causing the gateway apparatus to transmit a message(s) after matching the version of the communication protocol of the message(s) and the version of the communication protocol of the selected one of the first and second gateway apparatuses:

causing the gateway apparatus to determine whether a network connected to a communication peer is compliant with the first version of the communication protocol and the second version of the communication protocol different from the first version of the communication protocol; and when the gateway apparatus has determined that the network is compliant with the first version of the communication protocol and the second version of the communication protocol, causing the gateway apparatus to perform selection of the first gateway apparatus or the second gateway apparatus.

9. A non-transitory computer-readable storage medium that records a program, causing a computer constituting a gateway apparatus to perform processing for:

selecting a first gateway apparatus compliant with a first version of a communication protocol or a second gateway apparatus compliant with a second version of the communication protocol different from the first version of the communication protocol, the first and second gateway apparatuses being connected to a communication destination network, in such a manner that a selection rate of the first and second gateway apparatuses matches a predetermined rate;

converting, when the version of the communication protocol with which the selected one of the first and second gateway apparatuses is compliant is different from a version of a communication protocol of a message(s) received by the gateway apparatus, the version of the message(s);

transmitting a message(s) after matching the version of the communication protocol of the message(s) and the version of the communication protocol of the selected one of the first and second gateway apparatuses:

determining whether a network connected to a communication peer is compliant with the first version of the communication protocol and the second version of the communication protocol different from the first version of the communication protocol; and when it has been determined that the network is compliant with the first version of the communication protocol and the second version of the communication protocol, performing selection of the first gateway apparatus or the second gateway apparatus.

10. The gateway apparatus according to claim 1; wherein the first and second gateway apparatuses are a gateway apparatus compliant with a call processing message(s) based on Internet protocol version 4 and a gateway apparatus compliant with a call processing message(s) based on Internet protocol version 6.

11. The gateway apparatus according to claim 1; wherein a rate between a capacity of a transmission line to the first gateway apparatus and a capacity of a transmission line to the second gateway apparatus is used as the selection rate.

12. The gateway apparatus according to claim 2; wherein a rate between a capacity of a transmission line to the first gateway apparatus and a capacity of a transmission line to the second gateway apparatus is used as the selection rate.

13. The gateway apparatus according to claim 1; wherein the message(s) is a call processing message(s) based on SIP (Session Initiation Protocol) or H.323.

14. The gateway apparatus according to claim 2; wherein the message(s) is a call processing message(s) based on SIP (Session Initiation Protocol) or H.323.

15. The gateway apparatus according to claim 3; wherein the message(s) is a call processing message(s) based on SIP (Session Initiation Protocol) or H.323.

16. The gateway apparatus according to claim 4; wherein the message(s) is a call processing message(s) based on SIP (Session Initiation Protocol) or H.323.

17. The gateway apparatus according to claim 2; wherein the determination part determines the version of the communication protocol with which the network connected to the communication peer is compliant, based on record information included in a response from a DNS server.

18. The gateway apparatus according to claim 3; wherein the determination part determines the version of the communication protocol with which the network connected to the communication peer is compliant, based on record information included in a response from a DNS server.

19. The gateway apparatus according to claim 4; wherein the determination part determines the version of the communication protocol with which the network connected to the communication peer is compliant, based on record information included in a response from a DNS server.

* * * * *